US 10,907,055 B2

(12) United States Patent
Bettles et al.

(10) Patent No.: US 10,907,055 B2
(45) Date of Patent: Feb. 2, 2021

(54) CURING ULTRAVIOLET SENSITIVE POLYMER MATERIALS

(71) Applicant: Sensor Electronic Technology, Inc., Columbia, SC (US)

(72) Inventors: Timothy James Bettles, Columbia, TX (US); Michael Shur, Latham, NY (US); Alexander Dobrinsky, Loudonville, NY (US); Maxim S. Shatalov, Columbia, TX (US)

(73) Assignee: Sensor Electronic Technology, Inc., Columbia, SC (US)

( * ) Notice: Subject to any disclaimer, the term of this patent is extended or adjusted under 35 U.S.C. 154(b) by 445 days.

(21) Appl. No.: 15/422,749

(22) Filed: Feb. 2, 2017

(65) Prior Publication Data

US 2017/0218208 A1    Aug. 3, 2017

Related U.S. Application Data

(60) Provisional application No. 62/290,427, filed on Feb. 2, 2016.

(51) Int. Cl.
*B05C 9/14*        (2006.01)
*C09D 5/32*       (2006.01)
(Continued)

(52) U.S. Cl.
CPC .................. *C09D 5/32* (2013.01); *B05C 9/14* (2013.01); *B05D 3/067* (2013.01); *C09D 11/101* (2013.01);
(Continued)

(58) Field of Classification Search
None
See application file for complete search history.

(56) References Cited

U.S. PATENT DOCUMENTS

| 4,904,080 A | * | 2/1990 | Afromowitz | ...... G01N 21/4133 250/227.14 |
| 7,935,940 B1 | | 5/2011 | Smargiassi | |

(Continued)

FOREIGN PATENT DOCUMENTS

| EP | 2374547 A1 | 10/2011 | | |
| WO | WO-2014141910 A1 | * | 9/2014 | ........... G01N 21/359 |

OTHER PUBLICATIONS

Hyeon Jin, K., International Application No. PCT/US2017/016148, International Search Report and Written Opinion, Jun. 7, 2017, 14 pages.

*Primary Examiner* — Charles Capozzi
(74) *Attorney, Agent, or Firm* — LaBatt, LLC

(57) ABSTRACT

An approach for curing ultraviolet sensitive polymer materials (e.g., polymer inks, coatings, and adhesives) using ultraviolet radiation is disclosed. The ultraviolet sensitive polymer materials curing can utilize ultraviolet light at different wavelength emissions arranged in a random, mixed or sequential arrangement. In one embodiment, an ultraviolet light C (UV-C) radiation emitter having a set of UV-C sources that emit UV-C radiation at a predetermined UV-C duration and intensity operate in conjunction with an ultraviolet light B (UV-B) radiation emitter having a set of UV-B sources configured to emit UV-B radiation at a predetermined UV-B duration and intensity and/or an ultraviolet light A (UV-A) radiation emitter having a set of UV-A sources configured to emit UV-A radiation at a predetermined UV-A duration and intensity, to cure the ultraviolet sensitive polymer materials.

20 Claims, 10 Drawing Sheets

(51) Int. Cl.
 B05D 3/06 (2006.01)
 C09D 11/101 (2014.01)
 C09D 201/00 (2006.01)
 C09J 9/00 (2006.01)
 C09J 201/00 (2006.01)
 G21K 5/02 (2006.01)

(52) U.S. Cl.
 CPC .............. C09D 201/00 (2013.01); C09J 9/00 (2013.01); C09J 201/00 (2013.01); G21K 5/02 (2013.01)

(56) References Cited

U.S. PATENT DOCUMENTS

| | | | |
|---|---|---|---|
| 9,548,429 B2 | 1/2017 | Shatalov et al. | |
| 9,562,171 B2 | 2/2017 | Gaska et al. | |
| 2002/0191063 A1 | 12/2002 | Gelbart et al. | |
| 2005/0143483 A1* | 6/2005 | Sanuki | C08G 59/18 522/99 |
| 2006/0121208 A1 | 6/2006 | Siegel | |
| 2006/0127594 A1* | 6/2006 | Siegel | B05D 3/067 427/508 |
| 2008/0085369 A1* | 4/2008 | Cai | C09D 11/01 427/379 |
| 2009/0104448 A1* | 4/2009 | Thompson | B32B 37/12 428/413 |
| 2010/0206696 A1* | 8/2010 | Kondoh | B01L 3/50273 198/630 |
| 2012/0269983 A1* | 10/2012 | Grinberg | B41M 3/006 427/470 |
| 2013/0194365 A1 | 8/2013 | Edlitz et al. | |
| 2014/0063154 A1 | 3/2014 | Gould et al. | |
| 2015/0158312 A1* | 6/2015 | Childers | B41J 11/002 347/102 |
| 2015/0354132 A1 | 12/2015 | Schweers et al. | |
| 2016/0041090 A1* | 2/2016 | Kimura | G01N 21/359 427/553 |
| 2016/0064631 A1 | 3/2016 | Shatalov et al. | |
| 2016/0257113 A1 | 9/2016 | Grigore et al. | |
| 2016/0257135 A1 | 9/2016 | Grigore et al. | |
| 2017/0219174 A1 | 8/2017 | Agafonov et al. | |
| 2017/0219854 A1 | 8/2017 | Simin et al. | |

\* cited by examiner

CURING ULTRAVIOLET SENSITIVE POLYMER MATERIALS

REFERENCE TO RELATED APPLICATIONS

The present patent application claims the benefit of U.S. Provisional Application No. 62/290,427, which was filed on 2 Feb. 2016, and which is hereby incorporated by reference.

TECHNICAL FIELD

The disclosure relates generally to curing polymer materials, and more specifically, to a solution for curing ultraviolet sensitive polymer materials (e.g., polymer inks, coatings, adhesives, and the like).

BACKGROUND ART

Ultraviolet curing, commonly known as UV curing, is a type of curing that involves a photochemical process in which high-intensity ultraviolet light is used to create a photochemical reaction that instantly cures or "drys" polymer inks, coatings or adhesives. Benefits of UV curing include that it is a low temperature process, a high-speed process, and a solventless process, as the cure is by polymerization rather than by evaporation. These benefits make UV curing suitable for printing, coating, decorating, stereolithography and assembling of a variety of products and materials.

Mercury vapor lamps have traditionally been the industry standard for curing products with ultraviolet light. Mercury vapor lamps typically have a small-fused quartz arc tube mounted within a larger bulb. An electric arc is discharged through mercury in the arc tube to produce light by emitting a spectral output in the ultraviolet region of the light spectrum. The light intensity generated from mercury vapor lamps generally occurs in the 240 nm to 270 nm range and the 350 nm to 380 nm range, which can cause rapid curing.

Fluorescent lamps are another type of ultraviolet source used for UV curing applications. Generally, fluorescent lamps are a low pressure, mercury vapor gas-discharge lamp that uses fluorescence to produce visible light. In operation, an electric current in the gas excites mercury vapor which produces short-wave ultraviolet light that causes a phosphor coating on the inside of the lamp to glow. The fluorescent lamps are suitable for UV curing because of their ability to operate at specific frequencies.

In the last few years, ultraviolet light emitting diodes (UV LEDs) have been used in UV curing applications. UV LED curing technology offers many benefits over traditional broad-spectrum UV curing modalities like mercury vapor lamps and fluorescent lamps, such as lower operating costs and environmental attributes that eliminate mercury and ozone safety risks. Because UV LED curing is a relatively new type of UV curing technology, it is desirable to attain solutions that enable more effective curing of ultraviolet sensitive polymer materials such as inks, coatings, and adhesives.

SUMMARY OF THE INVENTION

This Summary Of The Invention introduces a selection of certain concepts in a brief form that are further described below in the Detailed Description Of The Invention. It is not intended to exclusively identify key features or essential features of the claimed subject matter set forth in the Claims, nor is it intended as an aid in determining the scope of the claimed subject matter.

Some aspects of the present invention are directed to utilizing ultraviolet light at different wavelength emissions that are arranged in a random, mixed, sequential or simultaneous arrangement to cure ultraviolet sensitive polymer materials such as polymer inks, coatings, and adhesives. These ultraviolet sensitive polymer materials can have varying thicknesses. In addition, the ultraviolet sensitive polymer materials can have liquid monomers and oligomers mixed with a small percent of photoinitiators. Also, the ultraviolet sensitive polymer materials can have selected pigments and additives. Exposure to ultraviolet energy causes the inks, coatings or adhesives that form the ultraviolet sensitive polymer materials to instantly harden.

The UV curing system of the illustrative embodiments described herein can include an ultraviolet illuminator including an ultraviolet light C (UV-C) radiation emitter having a set of UV-C sources configured to emit UV-C radiation at a predetermined UV-C duration and intensity, an ultraviolet light B (UV-B) radiation emitter having a set of UV-B sources configured to emit UV-B radiation at a predetermined UV-B duration and intensity, and an ultraviolet light A (UV-A) radiation emitter having a set of UV-A sources configured to emit UV-A radiation at a predetermined UV-A duration and intensity. A control unit is configured to direct the curing of the ultraviolet sensitive polymer material on a substrate with the UV-C radiation emitter and at least one of the UV-B radiation emitter and the UV-A radiation emitter.

In one embodiment, the control unit directs the UV-C radiation emitter to perform surface pinning of the ultraviolet sensitive polymer material, and one of the UV-B radiation emitter and the UV-A radiation emitter to perform a final curing of the ultraviolet sensitive polymer material after the surface pinning by the UV-C radiation emitter. The control unit can further direct the UV-C radiation emitter and at least one of the UV-B radiation emitter or the UV-A radiation emitter to cure the ultraviolet sensitive polymer material inhomogeneously at different lateral locations, wherein the UV-C radiation emitter cures the ultraviolet sensitive polymer material at a first location with the UV-C radiation at the predetermined UV-C duration and intensity, while one of the UV-B radiation emitter or the UV-A radiation emitter cures the ultraviolet sensitive polymer material at a second location with a different intensity and wavelength.

In one embodiment, the ultraviolet sensitive polymer material can include a multi-layered film formed on the substrate. In this manner, the UV-C radiation emitter can perform surface pinning of each layer formed on the substrate, while one of the UV-B radiation emitter or the UV-A radiation emitter can perform a final curing of the multi-layered film after the surface pinning of the outermost layer. In one embodiment, the multi-layered film can include droplets of the ultraviolet sensitive polymer material. For example, the droplets can be injected onto the substrate by a nozzle prior to forming any of the other layers. In one embodiment, the UV-C radiation emitter can cure the droplets of the ultraviolet sensitive polymer material with UV-C radiation at the predetermined UV-C duration and intensity, and one of the UV-B radiation emitter or the UV-A radiation emitter can perform the final curing of the droplets, thereby enabling the other layers of the multi-layered film to be formed thereon.

In another embodiment, an infrared light source can apply infrared heating to the droplets for coalescing into a larger domain of ultraviolet sensitive polymer material. An acoustic vibrational source can also be used with the infrared light source to promote the coalescing of the droplets through mechanical excitation. The infrared light source and the acoustic vibrational source can be used in place of the various ultraviolet emitters or these components can be used in conjunction with the emitters.

In one embodiment, a curing monitor can monitor the optical properties of the ultraviolet sensitive polymer material during the curing performed by the UV-C radiation emitter and at least one of the UV-B radiation emitter or the UV-A radiation emitter. The curing monitor, which can include a visible light source and a camera, can generate signals of the optical properties and send these signals to the control unit. The control unit can use these signals to monitor the curing of the ultraviolet sensitive polymer material. For example, the control unit can adjust the duration, intensity, wavelength and sequence of operation of the UV-C radiation emitter, UV-B radiation emitter, and/or UV-A radiation emitter in accordance with the optical properties.

In another embodiment, a reflectivity measuring device can be operatively coupled with the ultraviolet sensitive polymer material, the UV-C radiation emitter, the UV-B radiation emitter, the UV-A radiation emitter and the control unit. In this manner, the reflectivity measuring device can generate reflectivity measurement signals from the ultraviolet sensitive polymer material during the curing by the UV-C radiation emitter and one of the UV-B radiation emitter or the UV-A radiation emitter. In one embodiment, the reflectivity measurements are taken at a wavelength coincident with a characteristic thickness of the film of the ultraviolet sensitive polymer material.

The control unit can use these reflectivity measurement signals to infer a quality of the curing of the ultraviolet sensitive polymer material. For example, the quality of the curing can be determined in relation to predetermined quality reflectivity values that are representative of a targeted curing. In one embodiment, the reflectivity measuring device can include a light source and a sensor for measuring reflectivity data from that specific light source. In an embodiment, the light source can comprise a focused beam directed at a specific angle towards the ultraviolet sensitive polymer. In another embodiment, the angle of the beam can be varied. In addition, the location of the sensor and its orientation also can be adjusted to measure reflection at different reflection angles to evaluate diffusive properties for reflected light. In another embodiment, the light source can comprise a laser sensor that is configured to scan a surface of the ultraviolet sensitive polymer material with a laser beam and obtain reflectivity measurements at different locations of the ultraviolet sensitive polymer material.

A first aspect of the invention provides a system, comprising: a substrate having a film of an ultraviolet sensitive polymer material; an ultraviolet light C (UV-C) radiation emitter including a set of UV-C sources configured to emit UV-C radiation at a predetermined UV-C duration and intensity; an ultraviolet light B (UV-B) radiation emitter including a set of UV-B sources configured to emit UV-B radiation at a predetermined UV-B duration and intensity; an ultraviolet light A (UV-A) radiation emitter including a set of UV-A sources configured to emit UV-A radiation at a predetermined UV-A duration and intensity; and a control unit configured to direct curing of the ultraviolet sensitive polymer material with the UV-C radiation emitter and at least one of the UV-B radiation emitter or the UV-A radiation emitter.

A second aspect of the invention provides a system, comprising: a substrate having a film of an ultraviolet sensitive polymer material; an ultraviolet illuminator including an ultraviolet light C (UV-C) radiation emitter having a set of UV-C sources configured to emit UV-C radiation at a predetermined UV-C duration and intensity, an ultraviolet light B (UV-B) radiation emitter having a set of UV-B sources configured to emit UV-B radiation at a predetermined UV-B duration and intensity, and an ultraviolet light A (UV-A) radiation emitter having a set of UV-A sources configured to emit UV-A radiation at a predetermined UV-A duration and intensity; a curing monitor configured to monitor the optical properties of the ultraviolet sensitive polymer material during the curing performed by the UV-C radiation emitter and at least one of the UV-B radiation emitter or the UV-A radiation emitter; a reflectivity measuring device configured to generate reflectivity measurements from the ultraviolet sensitive polymer material during curing thereof; and a control unit operatively coupled with the ultraviolet sensitive polymer material, the UV-C radiation emitter, the UV-B radiation emitter, the UV-A radiation emitter, the curing monitor and the reflectivity measuring device configured to direct curing of the ultraviolet sensitive polymer material with the UV-C radiation emitter and at least one of the UV-B radiation emitter or the UV-A radiation emitter, wherein the control unit directs the UV-C radiation emitter to perform surface pinning of the ultraviolet sensitive polymer material and the at least one of the UV-B radiation emitter or the UV-A radiation emitter to perform final curing of the ultraviolet sensitive polymer material after surface pinning by the UV-C radiation emitter as a function of the optical properties and reflectivity measurements, wherein the control unit monitors optical properties of the ultraviolet sensitive polymer material during the curing and adjusts the duration, intensity, wavelength and sequence of operation the UV-C radiation emitter, UV-B radiation emitter, and UV-A radiation emitter in accordance with the optical properties, and wherein the control unit infers a quality of the curing of the ultraviolet sensitive polymer material from the reflectivity measurement signals obtained by the reflectivity measuring device.

A third aspect of the invention provides a method, comprising: forming a film of an ultraviolet sensitive polymer material on a substrate; directing an ultraviolet light C (UV-C) radiation emitter including a set of UV-C sources to emit UV-C radiation to the ultraviolet sensitive polymer material on the substrate at a predetermined UV-C duration and intensity for curing; and directing one of: an ultraviolet light B (UV-B) radiation emitter including a set of UV-B sources configured to emit UV-B radiation at a predetermined UV-B duration and intensity or an ultraviolet light A (UV-A) radiation emitter including a set of UV-A sources configured to emit UV-A radiation at a predetermined UV-A duration and intensity, to emit radiation to the ultraviolet sensitive polymer material for further curing thereof.

The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
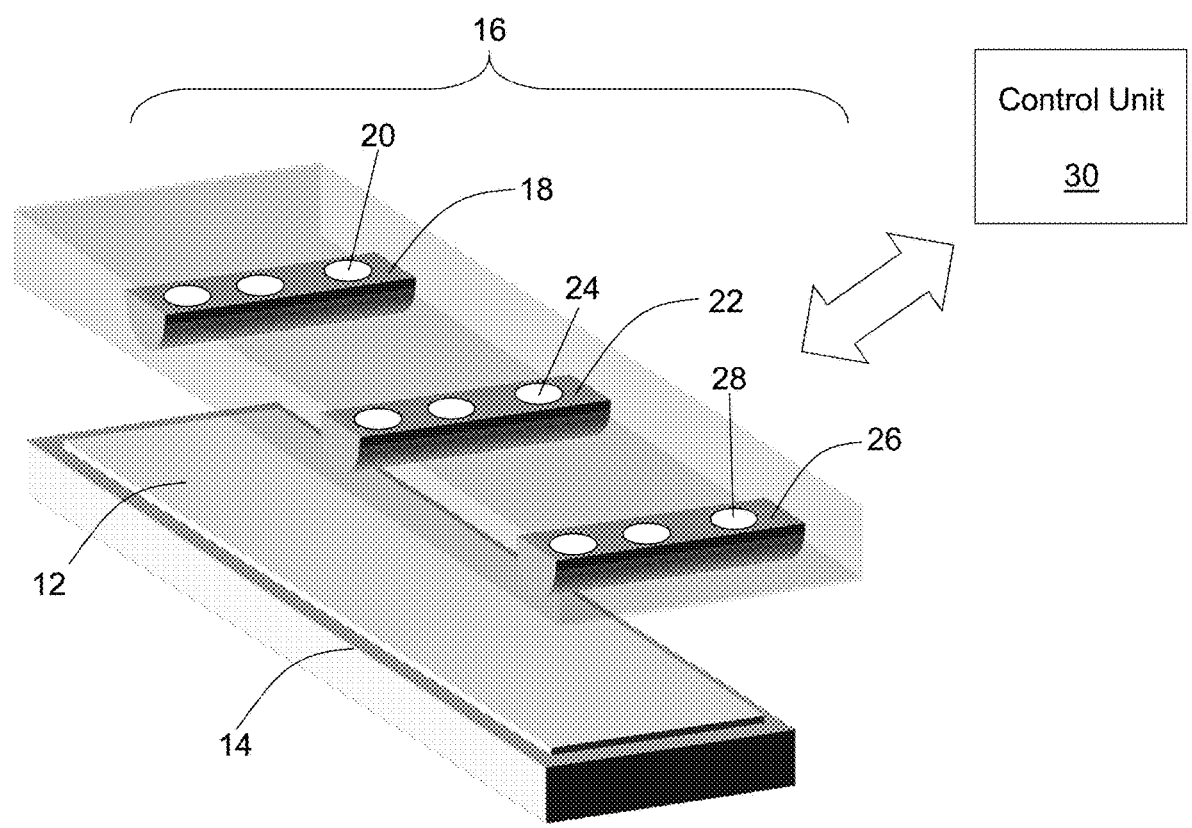
FIG. 1 shows a schematic of an illustrative UV curing system for curing a film of an ultraviolet sensitive polymer material on a substrate with an ultraviolet illuminator having an ultraviolet light C (UV-C) radiation emitter, an ultraviolet light B (UV-B) radiation emitter, and an ultraviolet light A (UV-A) radiation emitter according to an embodiment.

As indicated above, some aspects of the present invention are directed to utilizing ultraviolet light at different wavelength emissions, arranged in a random, mixed, sequential or simultaneous arrangement to cure ultraviolet sensitive polymer materials. As used herein, ultraviolet sensitive polymer materials is inclusive of any film including an ultraviolet sensitive polymer component. Illustrative films include polymer inks, coatings, and adhesives. The ultraviolet sensitive polymer materials can have liquid monomers and oligomers mixed with a small percent of photoinitiators. Also, the ultraviolet sensitive polymer materials can have selected pigments and additives. Exposure to ultraviolet energy causes the ultraviolet sensitive polymer materials to react and instantly harden to form a solid plastic.

The UV curing system of the illustrative embodiments described herein generally includes an ultraviolet illuminator having an ultraviolet radiation range that covers ultraviolet light C (UV-C), ultraviolet light B (UV-B), and ultraviolet light A (UV-A). Ultraviolet radiation, which can be used interchangeably with ultraviolet light, means electromagnetic radiation having a wavelength ranging from approximately 10 nm to approximately 400 nm, wherein UV-C encompasses electromagnetic radiation having a wavelength ranging from approximately 210 nm to approximately 280 nm, UV-B spans electromagnetic radiation having a wavelength ranging from approximately 280 nm to approximately 315 nm, and UV-A includes electromagnetic radiation having a wavelength ranging from approximately 315 nm to approximately 400 nm.

As used herein, a material/structure is considered to be "reflective" to ultraviolet light of a particular wavelength when the material/structure has an ultraviolet reflection coefficient of at least 30 percent for the ultraviolet light of the particular wavelength. A highly ultraviolet reflective material/structure has an ultraviolet reflection coefficient of at least 80 percent. Furthermore, a material/structure/layer is considered to be "transparent" to ultraviolet radiation of a particular wavelength when the material/structure/layer allows at least ten percent of radiation having a target wavelength, which is radiated at a normal incidence to an interface of the material/structure/layer to pass there through.

The curing systems described herein can include a number of components described below in more detail, some of which may be optional, that facilitate the curing of ultraviolet sensitive polymer materials. The modalities used with the various curing systems described herein including its respective components can include any now known or later developed approaches that incorporate the concepts of the embodiments described below in more detail.

The description that follows may use other terminology herein for the purpose of describing particular embodiments only and is not intended to be limiting of the disclosure. For example, unless otherwise noted, the term "set" means one or more (i.e., at least one) and the phrase "any solution" means any now known or later developed solution. The singular forms "a," "an," and "the" include the plural forms as well, unless the context clearly indicates otherwise. It will be further understood that the terms "comprises", "comprising", "includes", "including", "has", "have", and "having" when used in this specification, specify the presence of stated features, integers, steps, operations, elements, and/or components, but do not preclude the presence or addition of one or more other features, integers, steps, operations, elements, components, and/or groups thereof.

Turning to the drawings, FIG. 1 shows a schematic of an illustrative UV curing system 10 for curing a film of an ultraviolet sensitive polymer material 12 on a substrate 14 with an ultraviolet illuminator 16 having an ultraviolet radiation range that covers UV-C, UV-B, and UV-A. In one embodiment, the ultraviolet illuminator 16 includes a UV-C radiation emitter 18 comprising a set of UV-C sources 20 configured to emit UV-C radiation at a predetermined UV-C duration and intensity. In addition, the ultraviolet illuminator 16 can further include a UV-B radiation emitter 22 comprising a set of UV-B sources 24 configured to emit UV-B radiation at a predetermined UV-B duration and intensity. The ultraviolet illuminator 16 can also include a UV-A radiation emitter 26 comprising a set of UV-A sources 28 configured to emit UV-A radiation at a predetermined UV-A duration and intensity. It is understood that the number of UV sources in each of the UV-C radiation emitter 18, the UV-B radiation emitter 22 and the UV-A radiation emitter 26 as depicted in FIG. 1 is only illustrative and is not meant to the limit the various embodiments described herein.

Generally, the ultraviolet illuminator 16 can comprise any combination of one or more ultraviolet radiation emitters, each of which can be configured with one or more UV sources. Examples of ultraviolet sources include, but are not limited to, high intensity ultraviolet lamps (e.g., high intensity mercury lamps), discharge lamps, UV LEDs, super luminescent LEDs, laser diodes, and/or the like. In one embodiment, the ultraviolet illuminator can include a set of UV sources, such as UV LEDs, manufactured with one or more layers of materials selected from the group-III nitride material system (e.g., $Al_xIn_yGa_{1-x-y}N$, where $0 \le x$, $y \le 1$, and $x+y \le 1$ and/or alloys thereof). Additionally, the ultraviolet illuminator can comprise one or more additional components (e.g., a wave guiding structure, a component for relocating and/or redirecting ultraviolet radiation emitter(s), etc.) to direct and/or deliver the emitted radiation to a particular location/area, in a particular direction, in a particular pattern, and/or the like. Illustrative wave guiding structures include, but are not limited to, a wave guide, a plurality of ultraviolet fibers, each of which terminates at an opening, a diffuser, and/or the like.

Intensity, radiation wavelength, and duration of radiation are all parameters that have a role in the UV curing provided by the UV-C radiation emitter 18, the UV-B radiation emitter 22, and the UV-A radiation emitter 26 that can form the ultraviolet illuminator 16. These parameters for each of the ultraviolet radiation emitters can vary based on the ultraviolet sensitive polymer material 12 and the particular target UV curing that is desired. A proper setting of these parameters for each of the ultraviolet radiation emitters can ensure UV curing in a target manner that can include among other things, the lateral location of the curing, the pattern of the curing and the desired amount of polymerization of the ultraviolet sensitive polymer material 12.

Those skilled in the art will appreciate that each of the radiation emitters in the ultraviolet illuminator 16 can have more or less than the three UV sources (e.g., LEDs) depicted. Further, it is understood that each of the radiation emitters in the ultraviolet illuminator 16 can have different amounts of UV sources and is not necessary for each to have the same number. Also, it is understood that although the ultraviolet illuminator 16 is depicted in FIG. 1 as having three stations of ultraviolet radiation emitters, the illuminator can have one station that incorporates the UV-C radiation emitter 18, the UV-B radiation emitter 22, and the UV-A radiation emitter 26, or the UV-C radiation emitter 18 and only one of the UV-B radiation emitter 22 and the UV-A radiation emitter 26.

Examples of polymer inks, coatings, and adhesives that are suitable for use as the ultraviolet sensitive polymer material 12 that has liquid monomers and oligomers mixed with a small percent of photoinitiators in this embodiment as well as others described herein, can include, but are not limited to, acrylated resins, epoxies, aliphatic and aromatic urethanes, polyesters, and printing inks. In one embodiment, additional ink additives can be added to the ultraviolet sensitive polymer material 12 to facilitate curing and sensing such as for example, ultraviolet scattering powder, ultraviolet transparent nanoparticles, ultraviolet reflective nanoparticles, and electrically conductive elements or particles.

As shown in FIG. 1, a control unit 30 can be operatively coupled to the ultraviolet illuminator 16 to effectuate a UV curing operation of the ultraviolet sensitive polymer material 12 on the substrate 14. In one embodiment, the control unit 30 can be configured to direct curing of the ultraviolet sensitive polymer material 12 with the UV-C radiation emitter 18 and at least one of the UV-B radiation emitter 22 or the UV-A radiation emitter 26. In this manner, the control unit 30 can direct the UV-C radiation emitter 18 to perform surface pinning of the ultraviolet sensitive polymer material 12 and one of the UV-B radiation emitter 22 or the UV-A radiation emitter 26 to perform final curing of the ultraviolet sensitive polymer material after surface pinning by the UV-C radiation emitter. For example, the UV-C radiation emitter 18 can perform the surface pinning of the ultraviolet sensitive polymer 12 material by cross-linking the polymer at the surface of the polymer, while the UV-B radiation emitter 22 or the UV-A radiation emitter 26 can perform the final curing of the ultraviolet sensitive polymer material by cross-linking deeper into the polymer coating. In one embodiment, the intensity of radiation emitted by the UV radiation emitters 18, 22, 26 can be on the order of hundreds of $mW/cm^2$. Regardless, depending on the type and/or thickness of the ultraviolet sensitive polymer material 12 radiated, the intensity of UV radiation and time for radiating an ultraviolet sensitive polymer material can be optimized.

In general, the control unit 30 can direct the ultraviolet illuminator 16 to perform the UV curing of the ultraviolet sensitive polymer 12 material by controlling a plurality of operating parameters associated with the UV-C radiation emitter 18, the UV-B radiation emitter 22, and/or the UV-A radiation emitter 26. The operating parameters can include a wavelength of the ultraviolet radiation that is emitted from each of the ultraviolet radiation emitters, an intensity or dosage of the ultraviolet radiation delivered to the ultraviolet sensitive polymer material 12 on the substrate 14 by the emitters, and a time duration that the emitters delivers the ultraviolet radiation to the material. Other parameters can include, but are not limited to, a power setting for operating each of the ultraviolet radiation emitters, a selected subset of the ultraviolet sources to be operated on an emitter, and a maximum operating temperature of the emitters. It is understood that the control unit 30 can take the form of a device separate from the ultraviolet illuminator 16 as depicted in FIG. 1, or it can take the form of multiple components with each ultraviolet radiation emitter of the illuminator having a control unit integrated therein to control its specific operation.

Although not shown in this embodiment, information regarding the operating parameters can be obtained from a variety of sensors which can provide signals representative of those parameters to the control unit 30. These sensors as described below can include optical sensors, reflectivity measuring devices and the like. Furthermore, it is understood that a multitude of other types of sensors can implemented with the various embodiments described herein. For example, other sensors can include, but are not limited to, a temperature sensor, a chemical sensor, a radiation sensor, a transparency sensor, etc. Each of these sensors could detect the level or amount of a particular parameter that each is intended to measure and send signals thereof to the control unit 30. In this manner, the control unit 30 can invoke a feedback electrical control module that can monitor and adjust various parameters of the curing process.

Using the UV-C radiation emitter 18 to perform the surface pinning of the ultraviolet sensitive polymer material 12 and the UV-B radiation emitter 22 or the UV-A radiation emitter 26 to perform the final curing is advantageous because each of the different UV radiations has a different penetration depth. In particular, UV-C radiation has the lowest penetration depth and can be used for pinning the ultraviolet sensitive polymer material 12 prior to its complete curing using UV-B and/or UV-A radiation. The exact wavelength, intensity and duration of radiation depend on the particular application at hand.

It is understood that the UV-C radiation emitter 18 can be used to perform both the surface pinning and the final pinning of the ultraviolet sensitive polymer 12 material. Similarly, it is possible to have the UV-B radiation emitter 22 or the UV-A radiation emitter 26 perform both the surface pinning and the final pinning of the ultraviolet sensitive polymer 12. In another embodiment, one of the UV-B radiation emitter 22 and the UV-A radiation emitter 26 can be used to perform the surface pinning of the ultraviolet sensitive polymer 12, while the other can be used to perform the final pinning. Further, the curing operations performed by the UV-C emitter, the UV-B emitter and/or the UV-A emitter at varying wavelengths of radiation can occur simultaneously or at separate times.

Figure 2A:
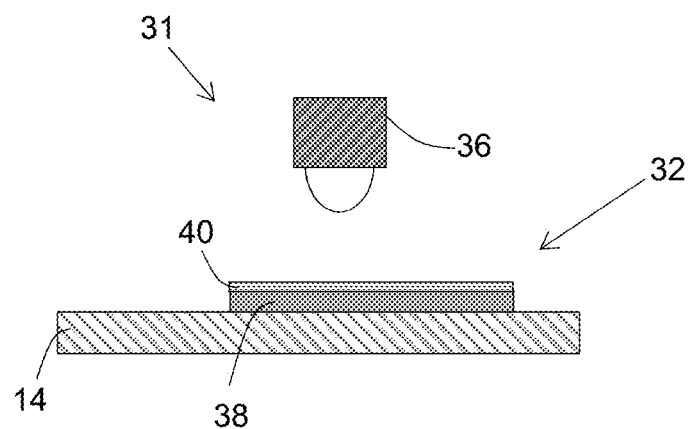
FIGS. 2A-2B show schematics of an illustrative UV curing system for curing a multi-layered film of an ultraviolet sensitive polymer material according to an embodiment.
Figure 2B:
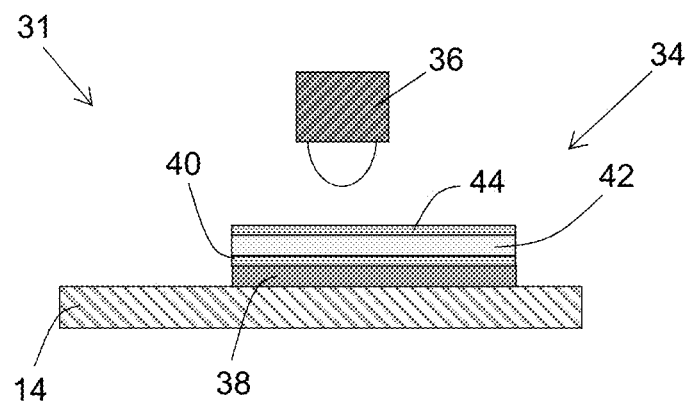

FIGS. 2A-2B show schematics of an illustrative UV curing system 31 for curing a single layer of film 32 and a multi-layered film 34 of an ultraviolet sensitive polymer material, respectively, on a substrate 14 with an ultraviolet illuminator 36 according to an embodiment. In FIG. 2A, the single layer of film 32 includes a layer 38 of the ultraviolet sensitive polymer material, which can include any of the aforementioned polymer inks, coatings, and adhesives, and/or pigments and additives. FIG. 2A further depicts a top surface 40 of the layer 38 of the ultraviolet sensitive polymer material that is cured by the ultraviolet illuminator 36.

In one embodiment, the ultraviolet illuminator 36 can have an ultraviolet radiation range that covers UV-C, UV-B, and UV-A. For clarity in this embodiment and others that follow, the ultraviolet illuminator 36 is illustrated with a single station that is configured with UV-C, UV-B, and UV-A emitters, however, it is understood that the illuminator can include multiple stations of ultraviolet radiation emitters. Also, for clarity, in this embodiment and others that follow, the control unit is not depicted with the ultraviolet illuminator 36. The control unit can be assumed to be integrated with the ultraviolet illuminator 36, however, it is understood that the control unit can be a component separate from the illuminator.

In a UV curing operation of the single layer of film 32 of the ultraviolet sensitive polymer depicted in FIG. 2A, the ultraviolet illuminator 36 can direct UV-C radiation onto the top surface 40 of the layer 38 of the ultraviolet sensitive polymer material for surface pinning of the material. The ultraviolet illuminator 36 can then follow up the surface pinning with a final curing of the layer 38 of the ultraviolet sensitive polymer material with the UV-B radiation and/or UVA radiation. In this manner, the ultraviolet illuminator 36 can cure just the top surface 40 of the layer 38 with the UV-C radiation (i.e., surface pinning) without curing the bulk of the ultraviolet sensitive polymer material (i.e., the layer 38). The ultraviolet illuminator 36 can then final cure both the top surface 40 and the bulk of the layer 38 with UV-B radiation and/or UVA radiation.

In FIG. 2B, the multi-layered film 34 of ultraviolet sensitive polymer material is depicted with a second layer 42 of the material having a top surface 44 formed on the first layer 38 and its top surface 40. This second layer 42 of the ultraviolet sensitive polymer material can include any of the aforementioned polymer inks, coatings, and adhesives, and/or pigments and additives. The second layer 42 of the ultraviolet sensitive polymer material can include the same material as that of the first layer 38 or it can be of a different type.

To perform a UV curing operation of the multi-layered film 34 of ultraviolet sensitive polymer material depicted in FIG. 2B, the ultraviolet illuminator 36 can use the UV-C radiation emitter to perform surface pinning of each layer of the ultraviolet sensitive polymer material and one of the UV-B radiation emitter or the UV-A radiation emitter to perform final curing of the multi-layered film after surface pinning an outer layer of the ultraviolet sensitive polymer material. For example, in the embodiment depicted in FIG. 2B, the top surface 40 of the first layer 38 can be cured with UV-C radiation. Then the second layer 42 of the ultraviolet sensitive polymer material can be formed over the cured top surface 40 of the first layer 38. This sequence ensures that the layers of films do not mix. The top surface 44 of the second layer 42 can then be cured with UV-C radiation. Although FIG. 2B depicts the multi-layered film 34 as only having two layers, it is understood that additional layers are possible and within the scope of the various embodiments of the present invention. Each additional layer that is applied to form the multi-layered film 34 can undergo surface pinning with UV-C radiation prior to application of the next layer. After all of the layers have been applied and undergone surface pinning, the ultraviolet illumination can emit UV-B radiation and/or UV-A radiation to the multi-layered film for final curing as these ranges of radiation can penetrate through the multiple layers to perform the curing.

Figure 3A:
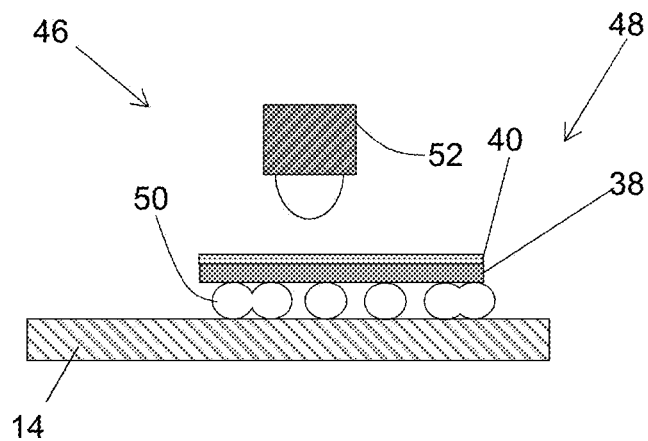
FIGS. 3A-3B show schematics of an illustrative curing system for curing a multi-layered film of an ultraviolet sensitive polymer material along with droplets of material placed between the multi-layered film and the substrate with an infrared light source according to an embodiment.
Figure 3B:
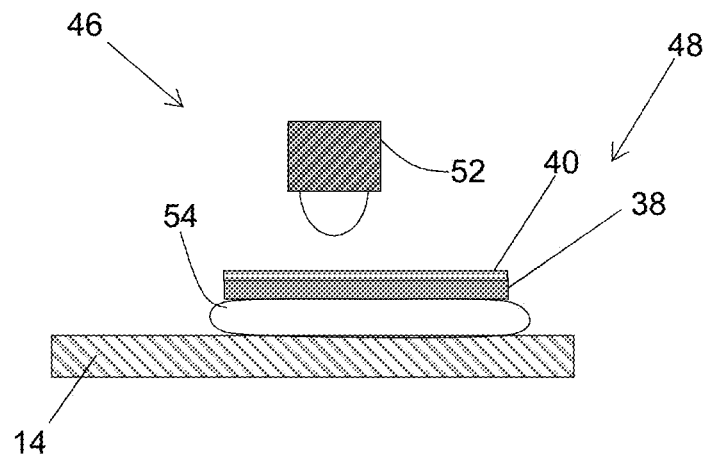

FIGS. 3A-3B show schematics of an illustrative curing system 46 for curing a multi-layered film 48 of an ultraviolet sensitive polymer material along with droplets 50 of a material placed between the multi-layered film and the substrate 14 according to an embodiment. In one embodiment, the droplets 50 can include ultraviolet sensitive polymer material of any of the aforementioned polymer inks, coatings, and adhesives, and/or pigments and additives. In one embodiment, the droplets 50 of ultraviolet sensitive polymer material can include, but are not limited to, printable ink, resins, epoxies, and/or the like. Although not shown in FIGS. 3A-3B, these droplets can be injected on the substrate 14 prior to the formation of the multi-layered film 48 by a nozzle.

In one embodiment, a curing operation of the multi-layered film 48 of ultraviolet sensitive polymer material and the droplets 50 can be performed with an infrared source 52. The infrared source 52 can comprise any type of infrared radiation emitter, such as one or more infrared LEDs, incandescent lamps, and/or the like. The infrared source 52 can emit radiation towards the multi-layered film 48 and the droplets 50 with a wavelength in the range of about 800 nanometers to about 1 micron. The infrared radiation emitted from the infrared source 52 can cure both the multi-layered film 48 which is shown in FIGS. 3A-3B with a layer 38 of ultraviolet sensitive polymer material with its top surface 40, and the droplets 50. FIG. 3B shows the infrared radiation from the infrared source can cause the droplets 50 to coalesce and form a large domain 54 of ultraviolet sensitive polymer material between the multi-layered film 48 and the substrate 14 prior to ultraviolet curing as described herein.

Figure 4:
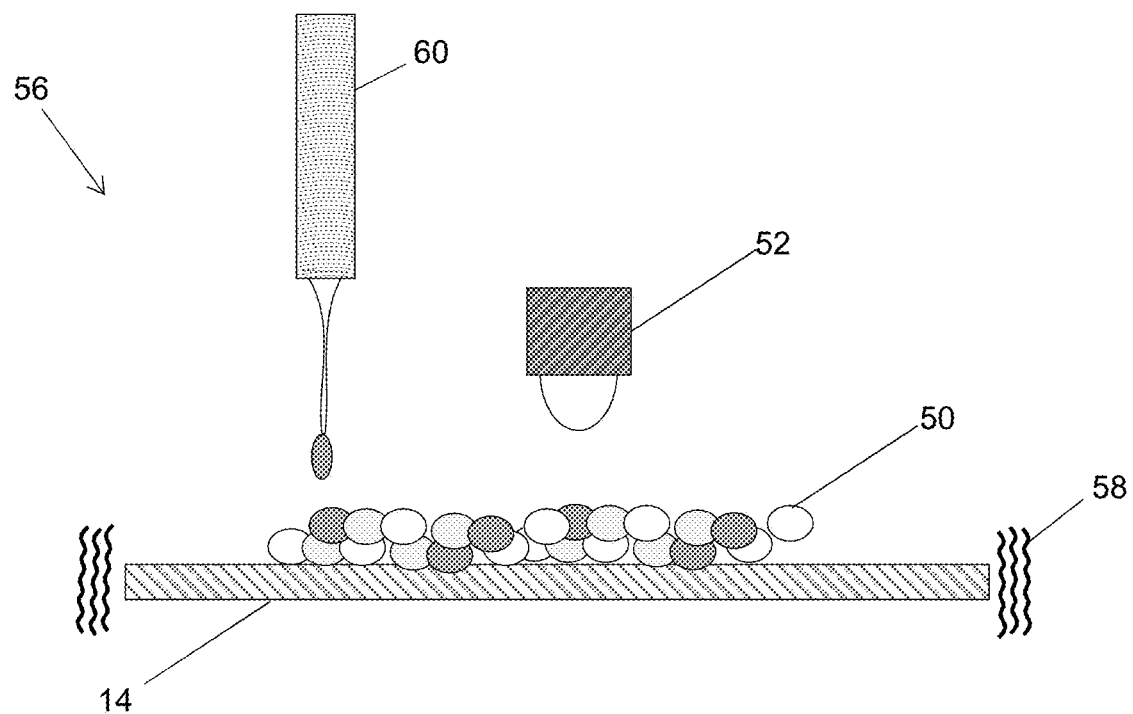
FIG. 4 shows a schematic of an illustrative curing system for curing droplets of material with an infrared light source and an acoustic vibrational source according to an embodiment.

FIG. 4 shows a schematic of an illustrative curing system 56 for curing droplets 50 of a material with an infrared light source 52 and an acoustic vibrational source 58 according to an embodiment. In this embodiment, a nozzle 60 can inject droplets 50 of ultraviolet sensitive polymer material onto the substrate 14. The nozzle 60 can be any conventional material nozzle that is configured to inject droplets of material on a substrate for subsequent curing. The nozzle 60 can be controlled by an integrated control unit or by an external control unit configured to control the infrared light source 52 and the acoustic vibrational source 58 in addition to the nozzle 60. The droplets 50 of ultraviolet sensitive polymer material can include any of the aforementioned materials. As shown in FIG. 4, the nozzle 60 can inject a multiple of different types of droplets 50 of material onto the substrate 14, which can lead to polymer mixing (such as ink mixing, for example) and chemical interaction of different droplets for improved curing.

The acoustic vibrational source 58 can mix the different droplets 50 of material through mechanical excitation of the substrate 14. This mixing of the different droplets 50 cause these individual droplets to coalesce into a larger domain of ultraviolet sensitive polymer material. This mechanical excitation imparted by the acoustic vibrational source 58 can occur simultaneously with the injection of the droplets 50 by the nozzle 60, or it can occur after all of the material has been deposited on the substrate 14. Examples of the acoustic vibrational source 58 can include, but are not limited to, a piezoelectric actuator, a mechanical sound actuator, and/or the like.

After mixing of the droplets, the infrared light source 52 can be used to cure the larger domain of coalesced ultraviolet sensitive polymer material. In one embodiment, the infrared source 52 can emit infrared radiation towards the larger domain of coalesced ultraviolet sensitive polymer material in the aforementioned wavelength range. The infrared radiation emitted from the infrared source 52 in this range will cure the domain of coalesced ultraviolet sensitive polymer material.

In another embodiment, an ultraviolet illuminator of the types described herein can be configured to operate cooperatively with the nozzle 60, the acoustic vibrational source 58, and the infrared source 52. For example, the ultraviolet illuminator can be used to emit UV-C radiation after a layer of droplets 50 have been deposited on the substrate and then followed up with either UV-B or UV-A radiation. If more than one layer is applied to the substrate, the ultraviolet illumination can emit UV-C radiation to each layer before a subsequent layer is formed thereon. After all of the layers have been applied and the last outer layer has been irradiated with UV-C radiation, then the ultraviolet illuminator can perform a final cure of the layers with UV-B and/or UV-A radiation. In one embodiment, the acoustic vibrational source 58 can be used to mix up the injected droplets prior to or in conjunction with the operation of the ultraviolet illuminator, while the infrared source 52 can be used to apply an additional cure as a complement to the curing provided by the illuminator. It is understood that other arrangements of operation of the ultraviolet illuminator with the nozzle 60, the acoustic vibrational source 58, and the infrared source 52 are possible.

Figure 5:
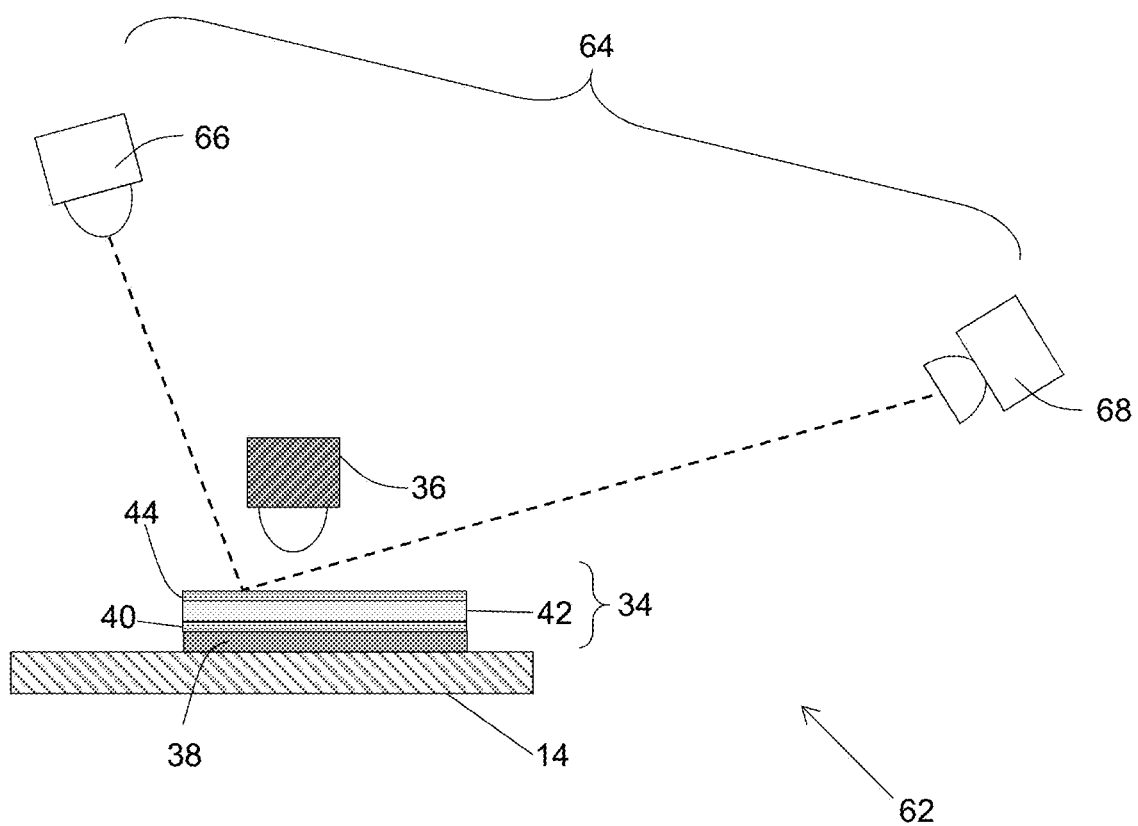
FIG. 5 shows a schematic of an illustrative UV curing system for a multi-layered film of an ultraviolet sensitive polymer material having a curing monitor to monitor the optical properties of the ultraviolet sensitive polymer material during the curing according to an embodiment.

FIG. 5 shows a schematic of an illustrative UV curing system 62 for a multi-layered film 34 of an ultraviolet sensitive polymer material having a curing monitor 64 to monitor the optical properties of the ultraviolet sensitive polymer material during the curing according to an embodiment. The curing monitor 64 is generally an optical system that can determine the curing progress and the success of the curing of the multi-layered film 34 of ultraviolet sensitive polymer material, which includes a first layer 38 and top surface 40, and a second layer 42 and top surface 44, by the ultraviolet illuminator 36.

In one embodiment, the curing monitor 64 can include a visible light source 66 that directs visible light towards the multi-layered film 34 on the substrate 14 during the curing provided by the ultraviolet illuminator 36, while a camera 68 records images of the surfaces of the various layers of the film while being irradiated with UV-C, UV-B, and UVA radiation. In this manner, the visible light source 66 and the camera 68 can serve as an optical sensor for evaluating the success or progress of the UV curing system 62. Although not shown in FIG. 5, a control unit can control operation of the UV curing performed by the ultraviolet illuminator 36 and the curing monitor 64. The control unit can be remote from the ultraviolet illuminator 36 and the curing monitor 64, or have components integrated with each.

In one embodiment, the optical properties that can be monitored from the curing monitor 64 can include, but are not limited to, transparency of the polymer, reflection and/or scattering from the polymer surface, polymer color, and/or the like. These optical properties can be monitored while an UV-C radiation emitter of the ultraviolet illuminator 36 emits UV-C radiation to each of the layers during surface pinning, while an UV-B radiation emitter and/or UV-A radiation emitter emits UV-B radiation and UV-A radiation, respectively, to the layers during final curing of the film. The curing monitor 64 can generate signals of these optical properties and transmits these signals to the control unit.

The control unit can monitor the curing of the multi-layered film 34 of ultraviolet sensitive polymer material as a function of the signals of the optical properties. For example, the control unit can adjust the duration, intensity, wavelength and sequence of operation of the UV-C radiation emitter, the UV-B radiation emitter, and the UV-A radiation emitter of the ultraviolet illuminator 36 in accordance with the optical properties sensed by the curing monitor 64.

By monitoring the curing of the multi-layered film 34 in this manner, the control unit can then determine whether the changes in applied wavelength or changes in intensity of applied wavelength resulted in an optimal curing. Those sequences of wavelengths, intensities and duration of illuminating sources that resulted in optimal quality curing can be noted as a good curing "recipe" or "regime" and stored into a data system for future use and reference as a database that allows for recalling of the curing regimes corresponding to different image qualities. For printing applications, the curing regimes can be stored as functions of a position on piece of paper. In this manner, the curing regimes can contain information on the curing of different parts of the image in a different color gamut. The control unit can also record the characteristics of the images from the curing monitor 64 that are produced during the curing and be used as part of the database.

In another embodiment, the curing monitor 64 can be used to monitor the curing process of ultraviolet sensitive polymer materials that can change color. For example, some polymer inks can change color during the curing process. In one embodiment, part of an ink can be cured to have a color image wherein part of the image is cured to be black and white, grey or sepia. Other inks can contain additives that change color during curing, and some inks can have fluorescent material that indicate where the UV-C or UV-A radiation is being deposited. In another example, the inks can be cured to be only visible under ultraviolet exposure for applications such as authentication purposes. In these examples, the different colors of the inks can be cured using different wavelengths of UV-C, UV-B, and/or UV-A radiation. The curing monitor 64 can be used to monitor the color changes of these inks in various ways, e.g., through the use of a camera.

Figure 6:
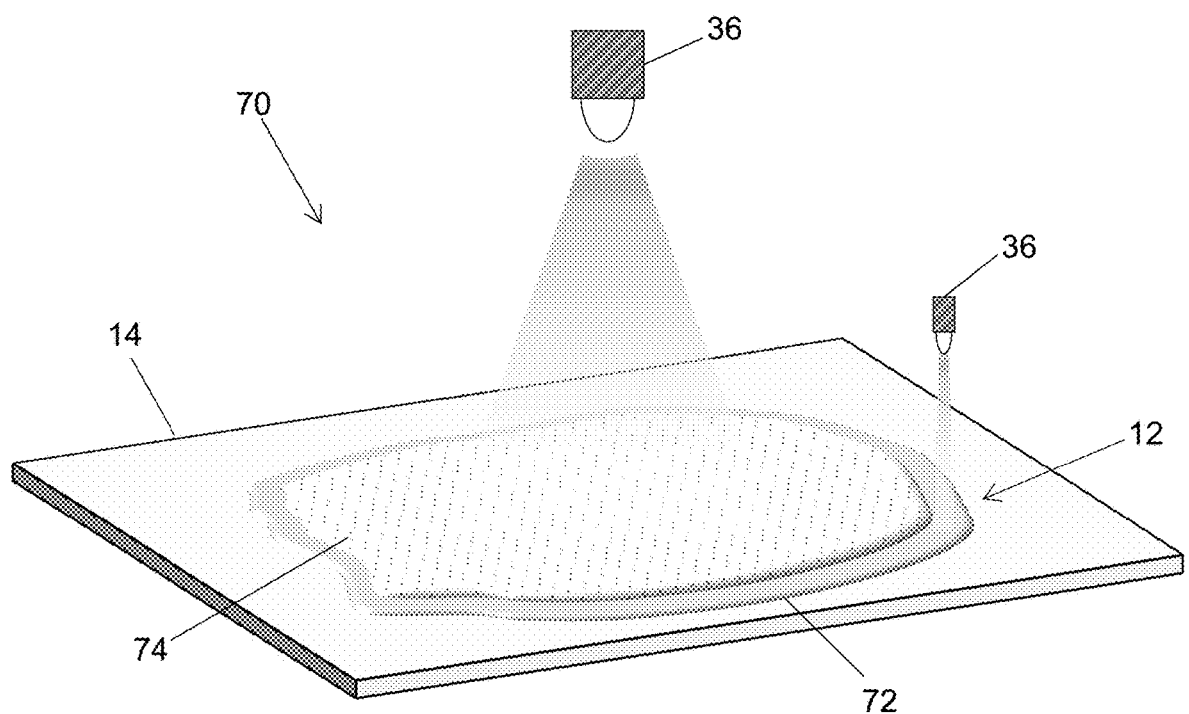
FIG. 6 shows a schematic of an illustrative UV curing system depicting inhomogeneous curing of an ultraviolet sensitive polymer material at different lateral locations according to an embodiment.

FIG. 6 shows a schematic of an illustrative UV curing system 70 depicting inhomogeneous curing of an ultraviolet sensitive polymer material 12 on a substrate 14 at different lateral locations according to an embodiment. The UV curing system 70 can include multiple ultraviolet illuminators 36 that emit ultraviolet radiation towards the ultraviolet sensitive polymer material 12. In one embodiment, as shown in FIG. 6, the UV curing system 70 can include two ultraviolet illuminators 36 each configured to emit ultraviolet radiation of different intensity and/or wavelength that is deposited at different portions of the ultraviolet sensitive polymer material 12. For example, one of the ultraviolet illuminators 36 can include an UV-C radiation emitter that emits UV-C radiation to one location of the ultraviolet sensitive polymer material 12, while the other illuminator can include either an UV-B radiation emitter or an UV-A radiation emitter that emits UV-B radiation and UV-A radiation, respectively, to a different location of the material, at predetermined wavelength-specific intensities and durations. This configuration enables the UV curing system 70 to cure the ultraviolet sensitive polymer material 12 inhomogeneously at different lateral locations. In addition, this configuration allows for improved mixing or confinement of the ultraviolet sensitive polymer material 12 depending on its application.

As shown in FIG. 6, one ultraviolet illuminator 36 can be centered over the ultraviolet sensitive polymer material 12, while the other ultraviolet illuminator 36 can located along an edge or peripheral location of the material in relation to the substrate 14. In one embodiment, the ultraviolet illuminator 36 centered over the ultraviolet sensitive polymer material 12 can include a UV-A radiation emitter, while the ultraviolet illuminator 36 located along an edge of the material can include a UV-C radiation emitter. In this configuration, the UV-C radiation emitter can be used to confine the ultraviolet sensitive polymer material 12 to a certain location 72 along the surface of the substrate 14, while the UV-A radiation emitter can be used to cure the overall domain 74 of the ultraviolet sensitive polymer material 12. It is understood that the rate of curing can be different for the UV-C radiation emitter and the UV-A radiation emitter. This difference in the rate of curing enables the UV-C radiation emitter to define the domain of the ultraviolet sensitive polymer material 12, and the UV-A radiation emitter to finalize the curing application for the material. In general, the UV-C radiation emitter can cure the ultraviolet sensitive polymer material 12 at a much higher rate as it is only cures the thin surface of the material. In another embodiment, the UV-C radiation emitter can emit UV-C radiation towards the ultraviolet sensitive polymer material 12 in a range having an absorption length that is no more than 10% of the absorption length in the range of UV-A radiation for the UV-A radiation emitter. This same range is also applicable in embodiments where a UV-B radiation emitter is used in place of or in addition to the UV-A emitter. That is, the UV-C radiation emitter can emit UV-C radiation in a range having an absorption length that is no more than 10% of the absorption length in the UV-B radiation for the UV-B radiation emitter.

It is understood that other configurations for curing lateral locations of the ultraviolet sensitive polymer material 12 are possible. In one embodiment, the ultraviolet illuminators can be fixed in specific locations with respect to the ultraviolet sensitive polymer material 12 and the substrate 14, or the illuminators can be configured to scan the material in a predetermined pattern to achieve the desired curing. Also, it is possible to replace the UV-A radiation emitter with a UV-B radiation emitter. Furthermore, it is understood that more than two ultraviolet illuminators can be used to cure the ultraviolet sensitive polymer material 12. Also, instead of having ultraviolet illuminators of a single range wavelength, it is possible to use illuminators that integrate multiple ranges that include UV-C, UV-B and/or UV-A radiation, that scan across the ultraviolet sensitive polymer material 12.

Figure 7:
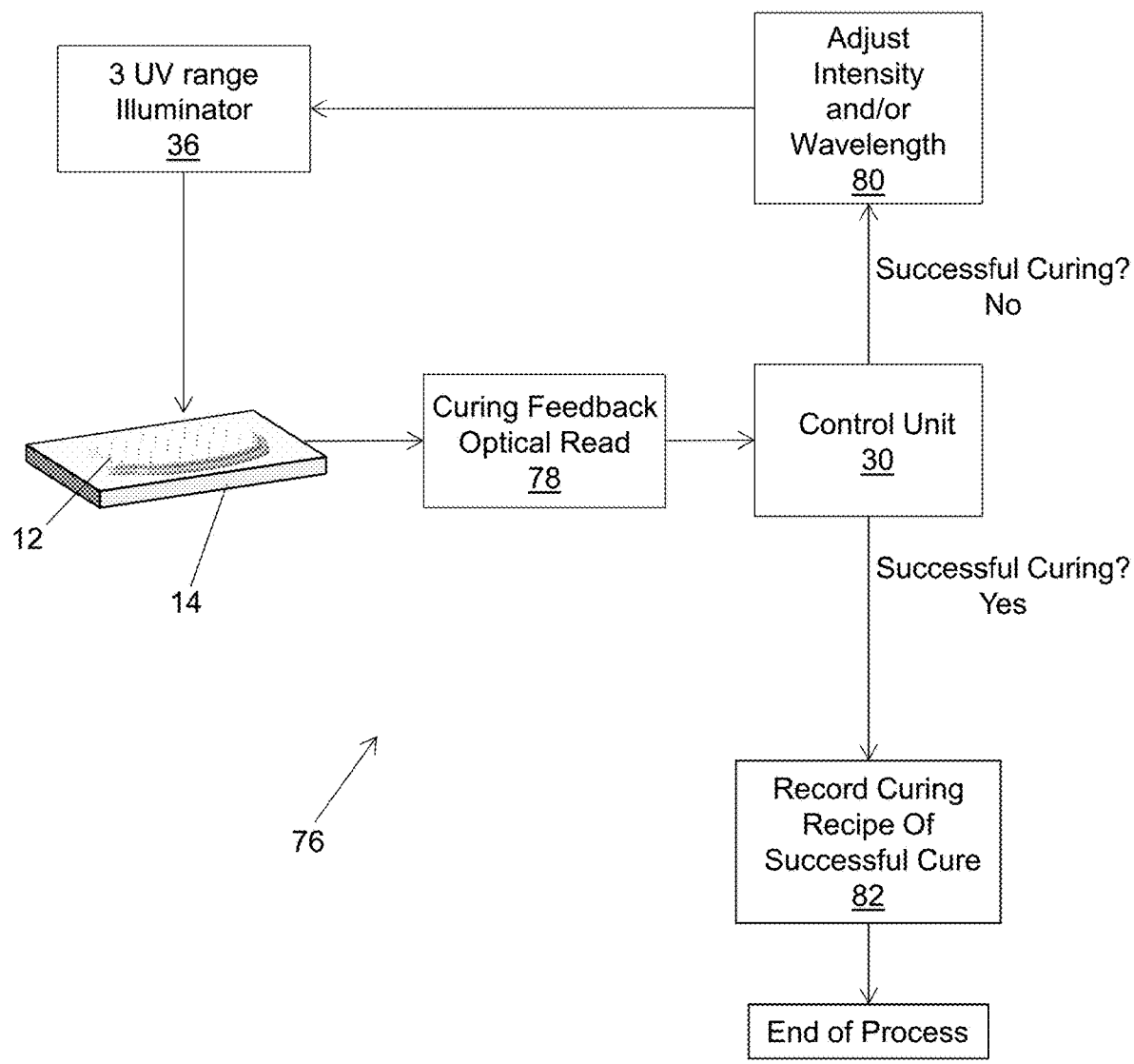
FIG. 7 shows a schematic illustrating the feedback control for a UV curing process of an ultraviolet sensitive polymer material with an ultraviolet illuminator having an UV-C radiation emitter, an UV-B radiation emitter, and an UV-A radiation emitter, and a control unit according to an embodiment.

FIG. 7 shows a schematic illustrating a feedback control process 76 for a UV curing process of an ultraviolet sensitive polymer material 12 placed on a substrate 14 with an ultraviolet illuminator 36 having an UV-C radiation emitter, an UV-B radiation emitter, and an UV-A radiation emitter, and a control unit 30 according to an embodiment. Each of the UV-C radiation emitter, the UV-B radiation emitter, and/or the UV-A radiation emitter can emit radiation at the ultraviolet sensitive polymer material 12 at a specific intensity, radiation wavelength, and duration. The ultraviolet illuminator 36 can cure the ultraviolet sensitive polymer material 12 using any of the aforementioned approaches.

During the UV curing operation of the ultraviolet sensitive polymer material 12, data can be obtained at 78 through the aforementioned curing monitor or any other type of sensors that can be used to obtain data on a plurality of operating parameters associated with the UV-C radiation emitter, the UV-B radiation emitter, and the UV-A radiation emitter. As mentioned above, the operating parameters can include a wavelength of the ultraviolet radiation that is emitted from each of the ultraviolet radiation emitters, an intensity or dosage of the ultraviolet radiation delivered to the ultraviolet sensitive polymer material 12 on the substrate 14 by the emitters, and a time duration that the emitters deliver the ultraviolet radiation to the material. Other parameters can include, but are not limited to, a power setting for operating each of the ultraviolet radiation emitters, and a maximum operating temperature of the emitters.

The control unit 30 can monitor the curing of the ultraviolet sensitive polymer material 12 as a function of the signals representative of the operating parameters monitored by the curing monitor and/or various other sensors. For example, the control unit 30 can adjust the duration, intensity, wavelength and sequence of operation of the UV-C radiation emitter, the UV-B radiation emitter, and/or the UV-A radiation emitter of the ultraviolet illuminator 36 in accordance with the sensed operating parameters at 80. The process of monitoring and adjusting operating parameters of the ultraviolet illuminator 36 continues until the control unit 30 determines that the curing is successful. Those sequences of wavelengths, intensities and duration of illuminating sources that result in optimal quality curing can be noted by the control unit 30 as a good curing "recipe" or "regime" and stored into a database for future use and reference. U.S. Pat. No. 8,277,734 describes a feedback control approach for modifying ultraviolet radiation according to the sensing of a system and is incorporated herein by reference.

It is understood that the processing approach illustrated in FIG. 7 is illustrative of only one approach of curing the ultraviolet sensitive polymer material and that other possibilities exist. For example, the method could include more or less steps than that described. Also, it is understood that some of these steps can be performed in a different order than that described.

Figure 8:
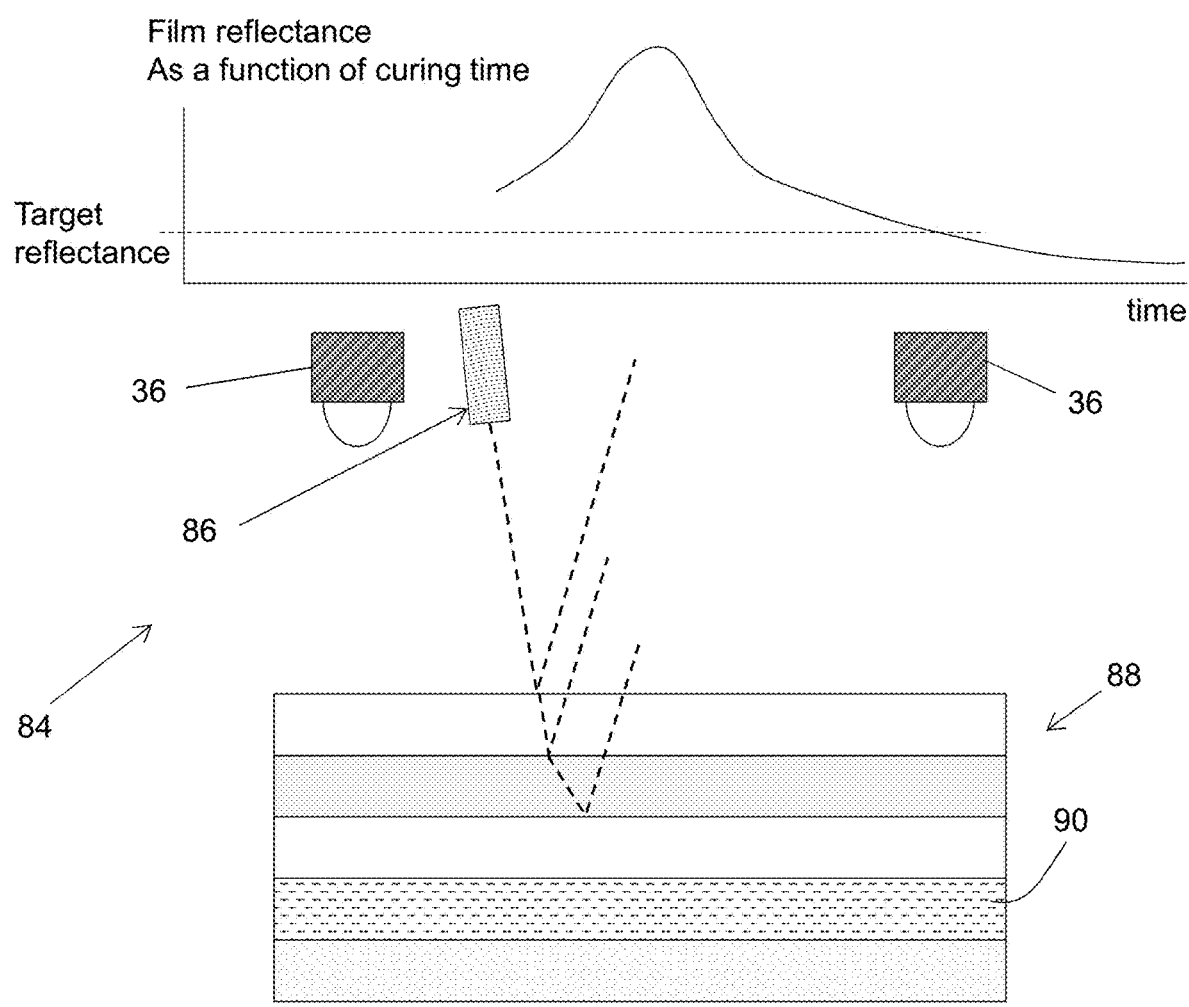
FIG. 8 shows a schematic of an illustrative UV curing system operating in conjunction with a reflectivity measuring device to generate reflectivity measurement signals from an ultraviolet sensitive polymer material during curing according to an embodiment.

FIG. 8 shows a schematic of an illustrative UV curing system 84 operating in conjunction with a reflectivity measuring device 86 to generate reflectivity measurement signals from a multi-layered film 88 of ultraviolet sensitive polymer material 90 during curing of the material by an ultraviolet illuminator 36 according to an embodiment. In one embodiment, the reflectivity measuring device 86 can generate reflectivity measurement signals from the multi-layered film 88 of ultraviolet sensitive polymer material, which can include any of the aforementioned materials, during a curing process by the UV-C radiation emitter and one or both of the UV-B radiation emitter and the UV-A radiation emitter that is associated with the ultraviolet illuminator 36.

The control unit, which is not illustrated in FIG. 8 for clarity, can infer a quality of the curing of the multi-layered film 88 of ultraviolet sensitive polymer material from the reflectivity measurements. In one embodiment, the control unit can infer a quality of the curing of the multi-layered film 88 of ultraviolet sensitive polymer material as a function of the reflectivity measurements, wherein the quality of the curing is determined in relation to predetermined quality reflectivity values representative of a targeted curing. For example, when the reflectivity values observed are in close proximity to the recorded reflectivity values, then the curing can be evaluated as being successful. An exact matching range will be evaluated depending on the type of material that is being cured.

The top portion of FIG. 8 illustrates an example of the reflectance of the multi-layered film of ultraviolet sensitive polymer material 88 as a function of time in relation to a target reflectance that achieves a targeted curing. In particular, the reflectance of the film 88 will approach an asymptotic value when the film 88 is cured. As illustrated, the measured reflectance of the film can be a combination of reflectance from multiple layers of the film 88. After processing the reflectivity measurements, the control unit can then record the data associated with each of the various curing operations.

In one embodiment, the reflectivity measuring device 86 can include a laser sensor that is configured to scan a surface of the multi-layered film 88 of ultraviolet sensitive polymer material with a laser beam and obtain reflectivity measurements at different locations of the ultraviolet sensitive polymer material. Scanning the surface of the multi-layer film at different points with the laser beam ensures that all points of the film undergo the curing. In one embodiment, the reflectivity measurements obtained by the laser sensor can be taken at a wavelength coincident with a characteristic thickness of the multi-layered film 88 of ultraviolet sensitive polymer material 90.

It is understood that the reflectivity measurements are one type of parameter that can be obtained from the UV curing operation and used to infer information on the state of the film 88 of ultraviolet sensitive polymer material 90 being cured and is not meant to limit the scope of the various embodiments described herein. It is understood that other parameters can be used to infer information on the state of the film. For example, electrical means, such as, lateral or vertical resistivity of the film 88, can be used to measure the resistivity of the film 88 of ultraviolet sensitive polymer material 90. In this manner, the control unit can infer the state of the material being cured from the resistivity measurements. For example, the resistivity values will approach a slowly varying asymptotic value when the film is cured.

Figure 9:
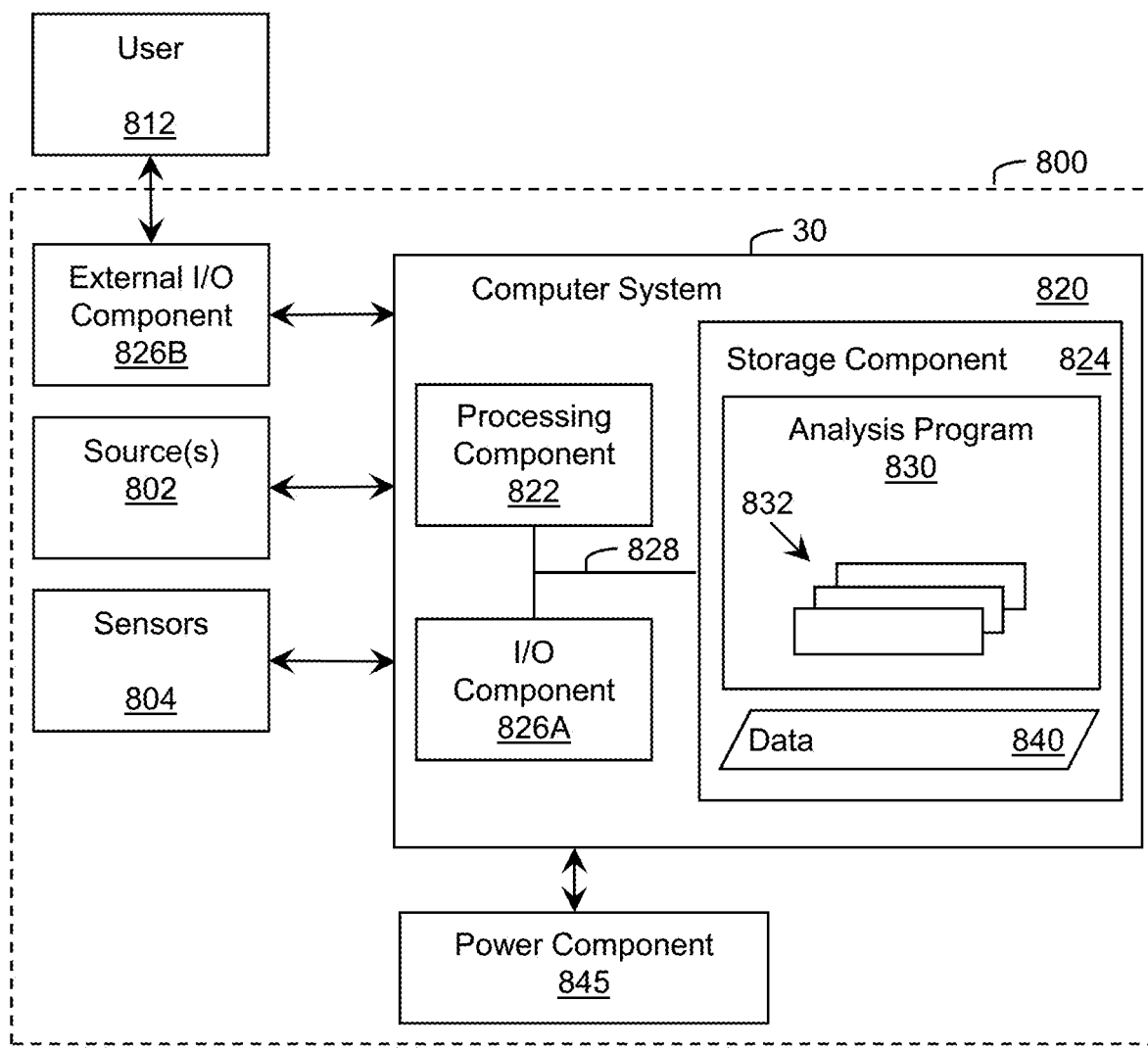
FIG. 9 shows a schematic block diagram representative of an overall processing architecture of a curing system that is applicable to any of the systems describe herein according to an embodiment.

FIG. 9 shows a schematic block diagram representative of an overall processing architecture of a curing system 800 that is applicable to any of the systems described herein according to an embodiment. In this embodiment, the architecture 800 is shown including sources 802 (e.g., ultraviolet sources including an ultraviolet illuminator having ultraviolet radiation emitters, infrared sources, visible sources, vibrational sources) and the sensors 804 (e.g., curing monitor, optical systems, reflectivity measuring devices, etc.) for the purposes of illustrating the interaction of all of the components that can be used to cure ultraviolet sensitive polymer material.

As depicted in FIG. 9 and described herein, the curing system 800 can include a control unit 30. In one embodiment, the control unit 30 can be implemented as a computer system 820 including an analysis program 830, which makes the computer system 820 operable to manage the sources 802 and the sensors 804 in the manner described herein. In particular, the analysis program 830 can enable the computer system 820 to operate the sources 802 and process data corresponding to one or more attributes regarding the sources and the ultraviolet sensitive polymer material, which can be acquired from the sensors 804, and/or historical data 840. The computer system 820 can individually control each source 802 and sensor 804 and/or control two or more of the sources and the sensors as a group.

In an embodiment, during an initial period of operation, the computer system 820 can acquire data from at least one of the sensors 804 regarding one or more attributes of the sources 802 and the ultraviolet sensitive polymer material and generate data 840 for further processing. The computer system 820 can use the data 840 to control one or more aspects of the curing process of the ultraviolet sensitive polymer material. Furthermore, one or more aspects of the operation of the sources 802 can be controlled or adjusted by a user 812 via an external interface I/O component 826B. The external interface I/O component 826B can be used to allow the user 812 to selectively turn on/off the sources 802.

The external interface I/O component 826B can include, for example, a touch screen that can selectively display user interface controls, such as control dials, which can enable the user 812 to adjust one or more of: an intensity, scheduling, and/or other operational properties of the sources 802 (e.g., operating parameters, radiation characteristics). In an embodiment, the external interface I/O component 826B could conceivably include a keyboard, a plurality of buttons, a joystick-like control mechanism, and/or the like, which can enable the user 812 to control one or more aspects of the operation of the set of sources 802. The external interface I/O component 826B also can include any combination of various output devices (e.g., an LED, a visual display), which can be operated by the computer system 820 to provide status information pertaining to the curing process for use by the user 812. In an embodiment, the external interface I/O component 826B can include a speaker for providing an alarm (e.g., an auditory signal), e.g., for signaling that the curing of the ultraviolet sensitive polymer material has finished.

The computer system 820 is shown including a processing component 822 (e.g., one or more processors), a storage component 824 (e.g., a storage hierarchy), an input/output (I/O) component 826A (e.g., one or more I/O interfaces and/or devices), and a communications pathway 828. In general, the processing component 822 executes program code, such as the analysis program 830, which is at least partially fixed in the storage component 824. While executing program code, the processing component 822 can process data, which can result in reading and/or writing transformed data from/to the storage component 824 and/or the I/O component 826A for further processing. The pathway 828 provides a communications link between each of the components in the computer system 820.

The I/O component 826A and/or the external interface I/O component 826B can comprise one or more human I/O devices, which enable a human user 812 to interact with the computer system 820 and/or one or more communications devices to enable a system user 812 to communicate with the computer system 820 using any type of communications link. To this extent, during execution by the computer system 820, the analysis program 830 can manage a set of interfaces (e.g., graphical user interface(s), application program interface, and/or the like) that enable human and/or system users 812 to interact with the analysis program 830. Furthermore, the analysis program 830 can manage (e.g., store, retrieve, create, manipulate, organize, present, etc.) the data, such as data 840, using any solution.

In any event, the computer system 820 can comprise one or more general purpose computing articles of manufacture (e.g., computing devices) capable of executing program code, such as the analysis program 830, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the analysis program 830 can be embodied as any combination of system software and/or application software.

Furthermore, the analysis program 830 can be implemented using a set of modules 832. In this case, a module 832 can enable the computer system 820 to perform a set of tasks used by the analysis program 830, and can be separately developed and/or implemented apart from other portions of the analysis program 830. When the computer system 820 comprises multiple computing devices, each computing device can have only a portion of the analysis program 830 fixed thereon (e.g., one or more modules 832). However, it is understood that the computer system 820 and the analysis program 830 are only representative of various possible equivalent monitoring and/or control systems that may perform a process described herein with regard to the control unit, the ultraviolet radiation sources and the sensors.

To this extent, in other embodiments, the functionality provided by the computer system 820 and the analysis program 830 can be at least partially be implemented by one or more computing devices that include any combination of general and/or specific purpose hardware with or without program code. In each embodiment, the hardware and program code, if included, can be created using standard engineering and programming techniques, respectively. In another embodiment, the control unit can be implemented without any computing device, e.g., using a closed loop circuit implementing a feedback control loop in which the outputs of one or more sensors are used as inputs to control the operation of the curing process. Illustrative aspects of the invention are further described in conjunction with the computer system 820. However, it is understood that the functionality described in conjunction therewith can be implemented by any type of monitoring and/or control system.

Regardless, when the computer system 820 includes multiple computing devices, the computing devices can communicate over any type of communications link. Furthermore, while performing a process described herein, the computer system 820 can communicate with one or more other computer systems, such as the user 812, using any type of communications link. In either case, the communications link can comprise any combination of various types of wired and/or wireless links; comprise any combination of one or more types of networks; and/or utilize any combination of various types of transmission techniques and protocols.

All of the components depicted in FIG. 9 can receive power from a power component 845. The power component 845 can take the form of one or more batteries, a vibration power generator that can generate power based on magnetic inducted oscillations or stresses developed on a piezoelectric crystal, a wall plug for accessing electrical power supplied from a grid, and/or the like. In an embodiment, the power source can include a super capacitor that is rechargeable. Other power components that are suitable for use as the power component can include solar, a mechanical energy to electrical energy converter such as a piezoelectric crystal, a rechargeable device, etc.

Figure 10:
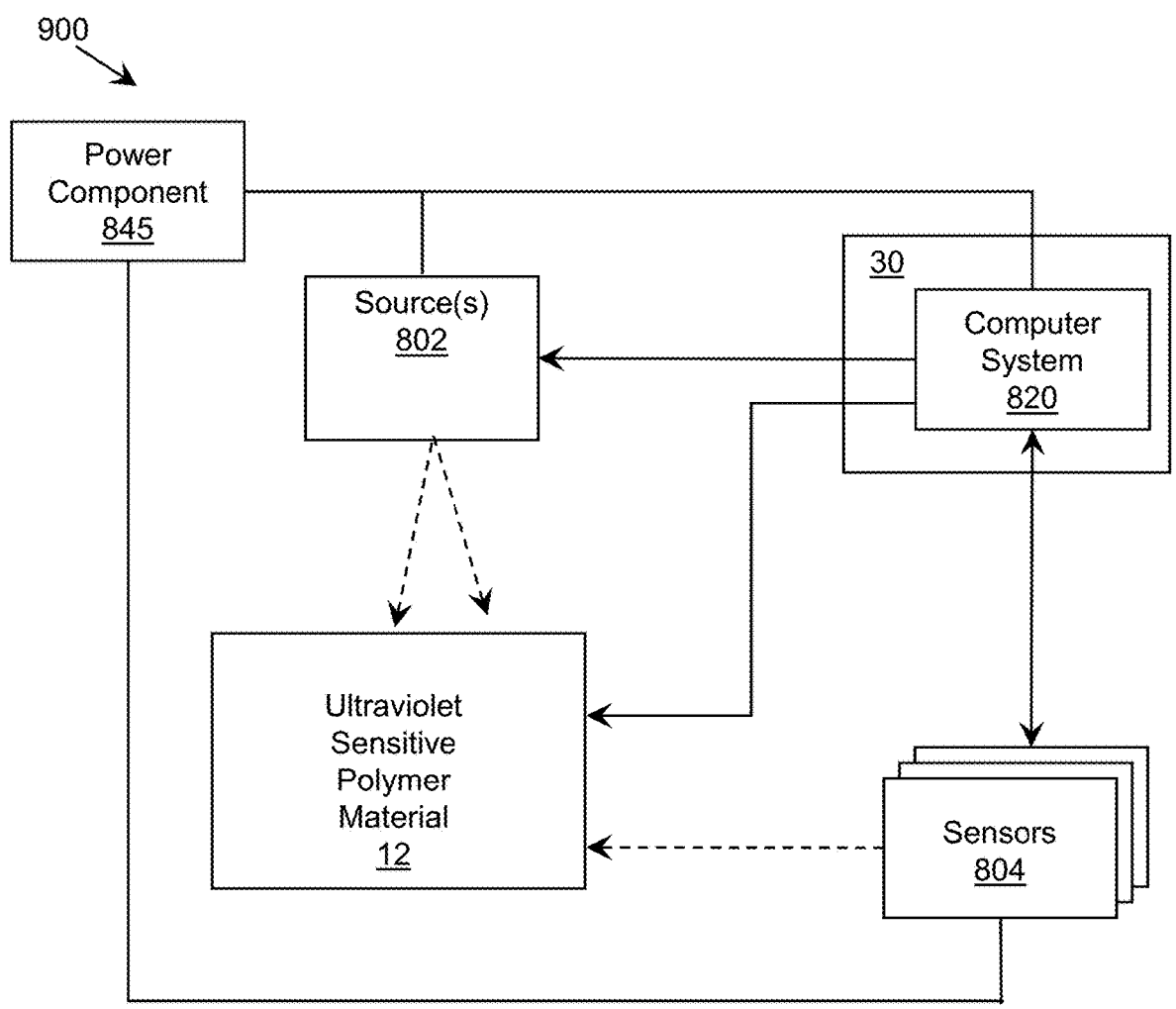
FIG. 10 shows a schematic of an illustrative environment in which the architecture of the curing system depicted in FIG. 9 can be used to facilitate curing of an ultraviolet sensitive polymer material according to an embodiment.

FIG. 10 shows a schematic of an illustrative environment 900 in which the architecture of the curing system depicted in FIG. 9 can be used to facilitate curing of an ultraviolet sensitive polymer material 12 according to an embodiment. In this embodiment, the computer system 820 of the control unit 30 can be configured to control the sources 802 during the curing as described herein. The sensors 804 are configured to acquire data processed by the computer system 820 to monitor a set of attributes regarding the curing of the ultraviolet sensitive polymer material 12. As illustrated, the sensors 804 can acquire data used by the computer system 820 to monitor the set of attributes (e.g., operating parameters, ultraviolet radiation characteristics).

In one embodiment, the computer system 820 can be configured to control and adjust a direction, an intensity, a pattern, and/or a spectral power (e.g., wavelength) of the set of ultraviolet radiation sources, based on data received from any of the sensors. The computer system 820 can control and adjust each property of the set of ultraviolet radiation sources independently. For example, the computer system 820 can adjust the intensity, time duration, and/or time scheduling (e.g., including duration (e.g., exposure/illumination time)), duty cycle, time between exposures/illuminations, and/or the like) of the ultraviolet radiation sources for a given wavelength. Each of the properties of the ultraviolet radiation sources can be adjustable and controlled by the computer system 820 according to data provided by the sensors 804.

It is understood that the environment 900 may include the power component 845 to supply power to one or more of the various components depicted in FIG. 10, such as the sources 802, the sensors 804, the computer system 820, and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system, comprising:
 an ultraviolet light C (UV-C) radiation emitter including a set of UV-C sources configured to emit UV-C radiation at a predetermined UV-C duration and intensity;
 an ultraviolet light B (UV-B) radiation emitter including a set of UV-B sources configured to emit UV-B radiation at a predetermined UV-B duration and intensity;

an ultraviolet light A (UV-A) radiation emitter including a set of UV-A sources configured to emit UV-A radiation at a predetermined UV-A duration and intensity; and a control unit configured to direct curing of a film of ultraviolet sensitive polymer material on a substrate with the UV-C radiation emitter and the UV-B radiation emitter and/or the UV-A radiation emitter, wherein the control unit is configured to identify which of the UV-B radiation emitter and/or the UV-A radiation emitter to use with the UV-C radiation emitter in the curing of the ultraviolet sensitive polymer material, the control unit specifying operating parameters of the UV-C radiation emitter and the UV-B radiation emitter and/or the UV-A radiation emitter in response to identifying use thereof for curing the ultraviolet sensitive polymer material, wherein the control unit is configured to specify operating parameters associated with operating the set of UV-C sources in the UV-C radiation emitter, the set of UV-B sources in the UV-B radiation emitter and the set of UV-A sources in the UV-A radiation emitter at the corresponding radiation associated with each source, the operating parameters including wavelength, intensity, and duration, and wherein the control unit is further configured to control the curing of the ultraviolet sensitive polymer material with the emitters identified for use by monitoring the operating parameters of the sources of the identified emitters during the curing and adjusting the parameters of the sources to conform to the specified parameters;

wherein the UV-C radiation emitter is located over a peripheral portion of the ultraviolet sensitive polymer material and the UV-B radiation emitter and/or the UV-A radiation emitter is located over a central portion of the ultraviolet sensitive polymer material, wherein the control unit is configured to direct the UV-C radiation emitter and the UV-B radiation emitter and/or the UV-A radiation emitter to cure the peripheral portion and the central portion of the ultraviolet sensitive polymer material inhomogeneously, wherein the UV-C radiation emitter confines the ultraviolet sensitive polymer material to within a certain location, while the UV-B radiation emitter and/or the UV-A radiation emitter cures an overall domain of the ultraviolet sensitive polymer material including the central portion.

2. The system according to claim 1, wherein the control unit directs the UV-C radiation emitter to perform surface pinning of the ultraviolet sensitive polymer material and the UV-B radiation emitter and/or the UV-A radiation emitter to perform final curing of the ultraviolet sensitive polymer material after the surface pinning by the UV-C radiation emitter.

3. The system according to claim 1, wherein the control unit is configured to direct the UV-C radiation emitter and the UV-B radiation emitter and/or the UV-A radiation emitter to cure a film of ultraviolet sensitive polymer material comprising a multi-layered film.

4. The system according to claim 3, wherein the control unit directs the UV-C radiation emitter to perform surface pinning of each layer of the ultraviolet sensitive polymer material, and the UV-B radiation emitter and/or the UV-A radiation emitter to perform final curing of the multi-layered film after surface pinning an outer layer of the ultraviolet sensitive polymer material.

5. The system according to claim 3, further comprising a nozzle directed by the control unit to inject droplets of the ultraviolet sensitive polymer material onto the substrate, wherein the multi-layered film of ultraviolet sensitive polymer material is formed on the droplets.

6. The system according to claim 5, wherein the control unit directs the UV-C radiation emitter to cure the droplets of the ultraviolet sensitive polymer material with UV-C radiation at the predetermined UV-C duration and intensity, and the UV-B radiation emitter and/or the UV-A radiation emitter to perform final curing of the droplets.

7. The system according to claim 5, further comprising an infrared light source directed by the control unit to apply infrared heating of the droplets of the ultraviolet sensitive polymer material for coalescing into a domain of ultraviolet sensitive polymer material.

8. The system according to claim 5, further comprising an acoustic vibrational source configured to promote the coalescing of the droplets of the ultraviolet sensitive polymer material through mechanical excitation.

9. The system according to claim 1, further comprising a curing monitor configured to monitor optical properties of the ultraviolet sensitive polymer material during the curing performed by the UV-C radiation emitter and the UV-B radiation emitter and/or the UV-A radiation emitter, and generate signals of the optical properties to the control unit, wherein the curing monitor includes a visible light source and a camera.

10. The system according to claim 9, wherein the control unit is configured to monitor the curing of the ultraviolet sensitive polymer material as a function of the signals of the optical properties, wherein the control unit adjusts the operating parameters and sequence of operation of the UV-C radiation emitter, the UV-B radiation emitter, and/or the UV-A radiation emitter, in accordance with the optical properties.

11. The system according to claim 1, further comprising a reflectivity measuring device, operatively coupled with the ultraviolet sensitive polymer material, the UV-C radiation emitter, the UV-B radiation emitter, the UV-A radiation emitter and the control unit, to generate reflectivity measurements from the ultraviolet sensitive polymer material during curing by the UV-C radiation emitter and the UV-B radiation emitter and/or the UV-A radiation emitter, the control unit using the reflectivity measurement to infer a quality of the curing of the ultraviolet sensitive polymer material, wherein the reflectivity measuring device includes a visible light source and a sensor, wherein visible light from the visible light source is reflected from a surface of the ultraviolet sensitive polymer material and detected by the sensor to obtain reflectivity measurements for the ultraviolet sensitive polymer material.

12. A system, comprising:
an ultraviolet illuminator including an ultraviolet light C (UV-C) radiation emitter having a set of UV-C sources configured to emit UV-C radiation at a predetermined UV-C duration and intensity, an ultraviolet light B (UV-B) radiation emitter having a set of UV-B sources configured to emit UV-B radiation at a predetermined UV-B duration and intensity, and an ultraviolet light A (UV-A) radiation emitter having a set of UV-A sources configured to emit UV-A radiation at a predetermined UV-A duration and intensity;

a curing monitor configured to sense optical properties of an ultraviolet sensitive polymer material during curing performed by the UV-C radiation emitter and the UV-B radiation emitter and/or the UV-A radiation emitter;

a reflectivity measuring device configured to generate reflectivity measurements from the ultraviolet sensitive polymer material during curing thereof; and a control unit, operatively coupled with the ultraviolet sensitive polymer material, the UV-C radiation emitter, the UV-B radiation emitter, the UV-A radiation emitter, the curing monitor and the reflectivity measuring device, configured to direct curing of the ultraviolet sensitive polymer material with the UV-C radiation emitter and the UV-B radiation emitter and/or the UV-A radiation emitter, wherein the control unit directs the UV-C radiation emitter to perform only surface pinning of a top surface of the ultraviolet sensitive polymer material without curing a bulk of the material underneath the top surface and the UV-B radiation emitter and/or the UV-A radiation emitter to perform final curing of both the top surface of the ultraviolet sensitive polymer material and the bulk of the material underneath the top surface after surface pinning by the UV-C radiation emitter as a function of the optical properties and reflectivity measurements, wherein the control unit monitors optical properties of the ultraviolet sensitive polymer material during the curing that are sensed by the curing monitor and adjusts the duration, intensity, wavelength and sequence of operation of the UV-C radiation emitter, UV-B radiation emitter, and/or UV-A radiation emitter, in accordance with the optical properties sensed by the curing monitor, and wherein the control unit infers a quality of the curing of the ultraviolet sensitive polymer material from the reflectivity measurement signals obtained by the reflectivity measuring device.

13. The system according to claim 1, wherein the control unit is configured to direct the UV-C emitter and the UV-B radiation emitter and/or the UV-A radiation emitter to simultaneously irradiate the ultraviolet sensitive material.

14. A system, comprising:

a nozzle to form ultraviolet sensitive polymer material on a substrate, wherein the nozzle is configured to inject droplets of the ultraviolet sensitive polymer material on the substrate and a multi-layered film of ultraviolet sensitive polymer material on the droplets of the ultraviolet sensitive polymer material;

an infrared light source to emit infrared radiation;

an ultraviolet light C (UV-C) radiation emitter including a set of UV-C sources configured to emit UV-C radiation at a predetermined UV-C duration and intensity;

an ultraviolet light B (UV-B) radiation emitter including a set of UV-B sources configured to emit UV-B radiation at a predetermined UV-B duration and intensity;

an ultraviolet light A (UV-A) radiation emitter including a set of UV-A sources configured to emit UV-A radiation at a predetermined UV-A duration and intensity; and a control unit configured to direct curing of the ultraviolet sensitive polymer material on the substrate with the infrared light source, the UV-C radiation emitter and the UV-B radiation emitter and/or the UV-A radiation emitter, wherein the control unit is configured to direct the infrared light source to irradiate the droplets of the ultraviolet sensitive polymer material with infrared radiation for curing into a domain of coalesced ultraviolet sensitive polymer material, and wherein the control unit is configured to direct the UV-C radiation emitter and the UV-B radiation emitter and/or the UV-A radiation emitter to cure the multi-layered film of ultraviolet sensitive polymer material and the domain of coalesced ultraviolet sensitive polymer material.

15. The system according to claim 14, wherein the infrared light source irradiates the droplets of the ultraviolet sensitive polymer material prior to formation of the multi-layered film of ultraviolet sensitive polymer material on the droplets by the nozzle.

16. The system according to claim 14, further comprising an acoustic vibrational source operatively coupled to the nozzle, wherein the acoustic vibrational source is configured to promote the coalescing of the droplets of the ultraviolet sensitive polymer material injected on the substrate by the nozzle through mechanical excitation.

17. The system according to claim 14, wherein the control unit is configured to direct the UV-C radiation emitter to irradiate each layer of the multi-layered film of ultraviolet sensitive polymer material with UV-C radiation, wherein the UV-C radiation emitter irradiates each layer of the multi-layered film of ultraviolet sensitive polymer material prior to formation of a subsequent layer thereon.

18. The system according to claim 17, wherein the control unit is configured to direct the UV-B radiation emitter and/or the UV-A radiation emitter to irradiate the multi-layered film of ultraviolet sensitive polymer material upon formation of a last layer.

19. The system according to claim 14, wherein the control unit is configured to direct the infrared light source to cure the multi-layered film of ultraviolet sensitive polymer material with infrared radiation as a complement to the curing provided by the UV-C radiation emitter and the UV-B radiation emitter and/or the UV-A radiation emitter.

20. The system according to claim 14, further comprising a curing monitor configured to monitor optical properties of the ultraviolet sensitive polymer material during the curing performed by the UV-C radiation emitter and the UV-B radiation emitter and/or the UV-A radiation emitter, and generate signals of the optical properties to the control unit, wherein the curing monitor includes a visible light source and a camera.

* * * * *